United States Patent
Ras et al.

(10) Patent No.: US 12,234,317 B2
(45) Date of Patent: Feb. 25, 2025

(54) POLYURETHANE COMPOSITION FOR THE MANUFACTURE OF FLOORS, ESPECIALLY FOR MARINE APPLICATIONS

(71) Applicant: SIKA TECHNOLOGY AG, Baar (CH)

(72) Inventors: Marcel Ras, Raalte (NL); Ronald Borkent, Deventer (NL)

(73) Assignee: SIKA TECHNOLOGY AG, Baar (CH)

( * ) Notice: Subject to any disclaimer, the term of this patent is extended or adjusted under 35 U.S.C. 154(b) by 493 days.

(21) Appl. No.: 17/629,136

(22) PCT Filed: Aug. 27, 2020

(86) PCT No.: PCT/EP2020/073993
§ 371 (c)(1),
(2) Date: Jan. 21, 2022

(87) PCT Pub. No.: WO2021/037992
PCT Pub. Date: Mar. 4, 2021

(65) Prior Publication Data
US 2022/0289899 A1    Sep. 15, 2022

(30) Foreign Application Priority Data
Aug. 27, 2019 (EP) .................................... 19193877

(51) Int. Cl.
| | | |
|---|---|---|
| *C08G 18/79* | (2006.01) | |
| *B63B 3/48* | (2006.01) | |
| *C04B 26/16* | (2006.01) | |
| *C08G 18/36* | (2006.01) | |
| *C08G 18/48* | (2006.01) | |
| *C08G 18/66* | (2006.01) | |
| *C09D 175/08* | (2006.01) | |
| *C04B 111/00* | (2006.01) | |
| *C04B 111/60* | (2006.01) | |

(52) U.S. Cl.
CPC ............. *C08G 18/792* (2013.01); *B63B 3/48* (2013.01); *C04B 26/16* (2013.01); *C08G 18/36* (2013.01); *C08G 18/4829* (2013.01); *C08G 18/6696* (2013.01); *C09D 175/08* (2013.01); *C04B 2111/0056* (2013.01); *C04B 2111/60* (2013.01)

(58) Field of Classification Search
CPC .. C08G 18/36; C08G 18/792; C08G 18/4829; C08G 18/6696; B63B 3/00; B63B 3/48; C04B 26/16; C04B 2111/0056; C04B 2111/60; C09D 175/08

USPC ........................................................ 114/85
See application file for complete search history.

(56) References Cited

U.S. PATENT DOCUMENTS

| | | | |
|---|---|---|---|
| 4,780,484 A | 10/1988 | Schubert et al. | |
| 5,532,280 A | 7/1996 | Allen et al. | |
| 10,830,387 B2 * | 11/2020 | Dodge | ................. C09D 175/08 |
| 2018/0320037 A1 | 11/2018 | Franken et al. | |

FOREIGN PATENT DOCUMENTS

| | | |
|---|---|---|
| CN | 102031057 A | 4/2011 |
| CN | 102585642 A | 7/2012 |
| CN | 105566892 A | 5/2016 |
| CN | 106280404 A | 1/2017 |
| CN | 109153812 A | 1/2019 |
| EP | 2796483 A1 | 10/2014 |
| JP | S63-270726 A | 11/1988 |
| JP | H05-031457 A | 2/1993 |
| JP | 2001-355628 A | 12/2001 |
| JP | 2015-214451 A | 12/2015 |
| JP | 2018-135504 A | 8/2018 |
| JP | 2019-508529 A | 3/2019 |
| WO | 2016195717 A1 | 12/2016 |
| WO | 2017082914 A1 | 5/2017 |
| WO | 2018002038 A1 | 1/2018 |

OTHER PUBLICATIONS

Carpol Carpenter Chemical's Division; "Carpol Polyols for Polyurethanes Product Guide Chemicals Division" , Sep. 25, 2019 ; https://carpenter.com/wp-content/uploads/2019/10/CARPOL_Polyols_Brochure_92019.pdf.
Silbrico Corporation: "SIL-CELL Cellular Microsphere Filler", Mar. 17, 2013; http://www.silbricocorporation.com/docs/Sil-Cell_Tech_Data.pdf.
Nov. 13, 2020 Search Report issued in International Application No. PCT/EP2020/073993.
Nov. 13, 2020 Written Opinion issued in International Application No. PCT/EP2020/073993.

* cited by examiner

*Primary Examiner* — Lars A Olson
(74) *Attorney, Agent, or Firm* — Oliff PLC

(57) ABSTRACT

A polyurethane composition includes a polyol component (A) including at least one polyol, a hardener component (B) including at least one polyisocyanate and glass microspheres along with the other optional additives and fillers. Further a method for applying polyurethane composition to create floors. The polyurethane composition is suitable as a flooring material.

12 Claims, No Drawings

POLYURETHANE COMPOSITION FOR THE MANUFACTURE OF FLOORS, ESPECIALLY FOR MARINE APPLICATIONS

TECHNICAL FIELD

The present invention relates to a polyurethane composition for manufacturing floors, especially for marine applications.

BACKGROUND OF THE INVENTION

Flooring compositions for outdoor applications are subject to stress caused by extremely harsh environmental conditions, especially sunlight. Sunlight is a type of electromagnetic wave which is divided into 3 to 7% of ultraviolet rays, 47 to 50% of visible rays and 43 to 50% of infrared rays. The impact of sunlight varies depending on the season and region, but infrared rays are responsible for causing the maximum damage to floor coating compositions. The absorbance of infrared rays results in vibration of molecules which generate heat and energy within the flooring substrate. The generation of heat within the flooring substrate is highly undesirable as it can lead to failure of floor coating composition by causing considerable wear and tear. Also, it may also lead to chipping, marring, crocking, scratching, etching or discoloration of the surface of the floor coating composition.

While preparing floors, especially for marine applications, it is utmost important to safeguard the flooring compositions on the substrate from solar radiations or more specifically, infrared rays. In case of a ship deck flooring, the accumulation of heat due to the infrared radiations causes significant heat discomfort to the passengers when touching the floor with bare hands or feet. Thus, it is highly desirable to design new improved flooring compositions that can survive the harsh, unforgiving conditions encountered in deep water environments and reduce the heat discomfort felt upon touch.

The marine industry by nature has its unique demands. Especially for marine applications, specific additional requirements have to be met. For example, improvement in the properties of Shore A, UV resistance, tensile strength, tear strength, abrasion etc.

In the field of marine applications, the industry is facing the issue of providing flooring surfaces that have specific functional characteristics, in combination with decorative effects that appeal to the eye. A recent trend in the industry is to use polymeric material as an alternative to natural flooring materials.

In the state of the art, some products based on one- or two-component polyurethane compositions are available, but they do not meet the above-mentioned specific requirements for marine applications, especially with respect to the much-needed heat reflective/shielding properties.

Flooring compositions need to be formulated by keeping in mind the various factors for example, application substrate, environmental conditions, specific surface characteristics, installation region, cost, life expectancy of flooring etc. It is important to understand the characteristics of the selected components as well as their compatibility with one another to achieve optimal performance.

SUMMARY OF THE INVENTION

Therefore, the object of the present invention is to provide new improved curable flooring compositions that are capable of displaying good reduction of the heat discomfort felt upon touch of substrates heated by infrared rays along with the other desirable properties for marine related applications, especially for ship decks. Another object of the present invention is to provide a method for applying a mixed polyurethane composition as a flooring material.

The present invention refers to a polyurethane composition comprising: A) a polyol component (A) comprising at least one polyol; and B) a hardener component (B) comprising at least one polyisocyanate. The polyurethane composition further comprises 0.5-8 wt.-% of hollow glass microspheres, based on the total weight of the polyurethane composition.

The invention also relates to a method for applying a mixed polyurethane composition preferably as a flooring material, more preferably for ship decks.

DETAILED DESCRIPTION OF THE INVENTION

In the context of the present invention, the following definitions may apply to the terms listed below, unless specified otherwise:

It must be noted that, as used in this specification and the appended claims, the singular forms "a," "an" and "the" include plural referents unless the content clearly dictates otherwise.

Substance names beginning with "poly", such as e.g. polyol or polyisocyanate, designate substances which formally contain, per molecule, two or more of the functional groups occurring in their names.

The average molecular weight is understood to mean the number average molecular weight, as determined using conventional methods, preferably by gel permeation-chromatography (GPC) using polystyrene as standard (Mn), styrene-divinylbenzene gel with porosity of 100 Angstrom, 1000 Angstrom and 10000 Angstrom as the column and tetrahydrofuran as a solvent, at 35° C.

The term average functionality in this document describes the average number of functional groups on a given molecule. For, e.g., a polyisocyanate, a functionality of 2 would describe a polyisocyanate molecule with in average 2 isocyanate groups per molecule.

The term "microsphere" refers to a spherical or ellipsoidal particle having a maximum dimension of less than one millimeter. The terms "microsphere," "bead," and "spherical" as used herein represents rounded unitary glass elements, which may not be perfect spheres.

The term "Hollow glass microsphere" as used in this document refers to hollow glass microsphere that have diameters ranging from 10 to 300 micrometers, more preferably less than 100 micrometers. The term "glass bead", "glass microspheres", "Hollow glass bubbles", "glass spheres", "glass balloons", "microscopic spheres of glass", "microballoons", "glass bubbles", "glass microbubbles", "hollow glass microspheres", "hollow glass beads", or "glass balloons" are interchangeably used to represent hollow glass microspheres.

The term "wear" as used herein refers to old, damaged floor surface that requires refinishing. The term "wear" also includes abrasion damage, crocking, marring, gouging, scratching, and defacement etc.

A "Two component composition" refers to a curable composition in the present document, the components are present in two different components stored in separate containers and are storage stable in each case for itself. Only shortly before or during the application of the composition, the two or more components are mixed together, where upon the mixed composition cures, the curing in some cases only runs through the action of moisture or is completed.

A filler, as this term is used in the present application, is a material which is non-reactive towards other constituents. Typically, the term filler refers to any material, matter, component and/or composition which is added to thicken the coated or casted composition, support its structure, and simply increase the volume of the composition and/or to lower the cost. Fillers are usually comprised of cheap and inert materials, such as one or more of talc, calcium carbonate, kaolin, lime, baryte, clay, etc.

The term "curing" as used herein refers to the composition that becomes harder or sets-in as a result of a chemical change/reaction.

The term "additive(s)" used herein is meant to comprise a component, agent, composition and the like usually added in smaller amounts (e.g. less than 0.5%, 0.04%, 0.2%, 1% or 0.8% of the total composition) and yet give a very significant effect on the product. Additives can comprise one or more of plasticizers, pigments, adhesion promoters, stabilizers against heat, light, and UV radiation, thixotropic agents, flow improving additives, flame retardants, surface active agents such as defoamers, wetting agents, flow control agents, deaerating agents, biocides, and emulsifiers. Often, composition and/or coating composition comprises one or more additives.

The term "plasticizer" as used herein refers to substances that are added to polymer resins to impart softness and flexibility. Phthalic acid diesters (also known as "phthalates") are known plasticizers in many flexible polymer products, such as polymer products formed from polyurethane and other related polymers. Examples of common phthalate plasticizers include di-isononyl phthalate (DINP), diallyl phthalate (DAP), di-2-ethylhexyl-phthalate (DEHP), dioctyl phthalate (DOP), diisodecyl phthalate (DIDP), benzyl phthalates and benzylbutyl phthalate. Mixtures of plasticizers are often used to obtain optimum properties.

The term "defoamer" or "anti-foaming agent" as used herein refers to a chemical additive that reduces and hinders the formation of foam in industrial process liquids.

The term "coating composition" as used herein refer to a fluid composition that can be applied to a substrate and cured afterwards. Typically, the coating composition is in the form of a pourable liquid or a heavy paste, and includes a particulate polymer dispersed or suspended in a liquid organic plasticizer material that is compatible with the polymer. The term "coating" is used to describe a layer or film that remains on the substrate surface after deposition and curing of the coating composition.

A coating composition of the present invention can be used in connection with a wide variety of products that require protective coatings or layers, and the present invention provides coating compositions that are especially well adapted to act as surface coverings for various substrate surfaces. In a preferred aspect of the invention, coating compositions are used to provide surface coverings for a substrate employed in deep water/marine applications, such as, for example, ship deck surface, especially floor panels used in ship decks and the like.

The term "application" is used in its ordinary sense in the paint industry. Accordingly, by any conventional means "coating", e.g., by brush, by roller, by airless spraying, by air spraying, carried out by immersion by like. Commercially most interesting of the coating composition "coating" method is by spraying. Spray fulfils by known conventional spray devices to those skilled in the art.

As used herein, the term "wt %" means weight percent or percentage by weight.

As used herein, unless otherwise indicated, the term "size (or diameter) means particle" refers to the size (or diameter) average particle distribution of particles as determined by electrical impedance using a Multisizer™ 3 Coulter (Beckman Coulter, Inc., Fullerton, CA) according to manufacturer's recommended procedures. The median is defined as the size at which 50% by weight of the particles in the distribution are smaller than the median and 50% by weight of the particles in the distribution are larger than average. This is an average particle size by volume.

For the standards, specifications or test specifications mentioned in the present text, the version valid on the priority date shall apply unless otherwise specified.

In a first aspect the present invention relates to a polyurethane composition comprising:
  A) a polyol component (A) comprising at least one polyol; and
  B) a hardener component (B) comprising at least one polyisocyanate,
whereby the polyurethane composition further comprises 0.5-8 wt.-% of hollow glass microspheres, based on the total weight of the polyurethane composition.

The composition of the invention consists of at least 2 individual components, which are stored separately in order to avoid spontaneous reaction, and are combined when a polyurethane flooring or coating is to be prepared. The components may be assembled together as a package. The at least two components are a polyol component (A) and a polyisocyanate component (B) which are also simply referred to as component (A) and component (B), respectively, which are described in the following.

Polyol Component (A)

The polyol component (A) comprises one or more polyols. Optionally, one or more additives may be added to polyol component (A). Polyol component (A) is preferably a liquid component. The polyol component (A) may be viscous but is preferably pourable.

Examples of suitable polyols are selected from the list consisting of polyoxyalkylenepolyols, also referred to as "polyetherpolyols", polyesterpolyols, polycarbonatepolyols, poly(meth)acrylate polyols, polyhydrocarbon-polyols, polyhydroxy-functional acrylonitrile/butadiene copolymers and mixtures thereof, in particular diols thereof, polyhydroxy-functional natural fats and natural oils and polyols obtained by chemical modification of natural fats or natural oils.

Preferably, the polyol component (A) comprises at least one polyol (A1) having an average molecular weight of 250 to 30'000 g/mol, preferably 1000 to 30'000 g/mol and an average OH functionality in the range from 1.6 to 3; and at least one polyol (A2) having an average molecular weight of 360 to 4000 g/mol.

Particularly preferred polyols for the polyol (A1) to be used in the present invention are polyhydroxy-functional natural fats and oils, preferably castor oil, or polyols obtained by chemical modification of natural fats or natural oils, so-called oleochemical polyols. Castor oil is particularly preferred as natural oil and castor oil is particularly preferred as basis for polyols obtained by chemical modification of natural fats and natural oils.

The polyols mentioned above usually have a relatively high molecular weight, for instance, an average molecular weight of from 250 to 30000 g/mol, in particular from 1000 to 30000 g/mol, and/or an average OH functionality in the range from 1.6 to 3.

More preferably the at least one high molecular weight polyol (A1) is a reaction product of castor oil with ketone resins having an OH number of 110 to 200 mg KOH/g.

With respect to the reaction product of castor oil with ketone resins having an OH number of 110 to 200 mg KOH/g (i.e. polyol A1), preference is given to an OH number of 155 to 190 mg, especially 140 to 170 mg, especially preferably 150-160 mg KOH/g. It preferably has an OH equivalent weight of 300 to 400 g/eq.

Particular preference is given to reaction products of castor oil with ketone resins based on cyclohexanone, especially those as sold, for example, by Nuplex Resins GmbH, Germany under the Setathane® 1150 name and by BASF, Germany under the Sovermol® 805 name.

In the present document, the term "castor oil" is preferably understood to mean castor oil as described in the Online Römpp Chemie Lexikon [Römpp's Chemical Lexicon online], Thieme Verlag, retrieved 23.12.2016.

In the present document, the term "ketone resin" is preferably understood to mean ketone resin as described in Online Römpp Chemie Lexikon [Römpp's Chemical Lexicon online], Thieme Verlag, retrieved 23.12.2016.

Preferably, the polyol (A2) has an average molecular weight of 360 to 4000 g/mol, preferably 400 and 3000 g/mol, more preferably 400 and 2000 g/mol, 400 and 1000 g/mol, most preferably, 400 and 800 g/mol.

Preferably, the polyol (A2) is an aliphatic polyol, preferably an aliphatic triol. There are different kinds of such aliphatic triols. Thus, for example, they may contain urethane and/or urea and/or ether groups. The morphology of the triols may be very different. Thus, for example, star-shaped or comb-shaped triols are possible. It is additionally possible for the triol to contain not only primary but also secondary hydroxyl groups. Preferably all three hydroxyl groups are primary hydroxyl groups.

Such aliphatic triols can be attained, for example, from an aliphatic triisocyanate, more particularly from an isocyanurate, which is formed from three isocyanate molecules, in an excess of aliphatic diols, more particularly of polyetherdiols, where appropriate by further subsequent extension by means of aliphatic diisocyanates and aliphatic diols.

Further exemplary aliphatic triols may be obtained from low molecular weight aliphatic triols, such as trimethylolpropane or glycerol, for example, and an aliphatic diisocyanate, with subsequent reaction with an aliphatic diol.

Preferred aliphatic triols are products of an alkoxylation reaction of low molecular weight aliphatic triols, preferably trimethylolpropane and glycerol. In particular these are triols selected from the list consisting of ethoxylated, propoxylated and butoxylated aliphatic triols.

Preferably, the polyol (A1) is selected from polyhydroxy-functional natural fats and polyhydroxy-functional natural oils or a polyol obtained by chemical modification of a natural fat or natural oil, wherein said polyol (A1) is preferably castor oil or a chemical modification thereof and the polyol (A2) is a di- or triol, preferably the polyol (A2) is an aliphatic polyol, more preferably an aliphatic triol.

Preferably, the polyols (A1) and the polyols (A2) are different molecules,

Preferably, the weight ratio of the polyol (A1) to the polyol (A2) ((A1)/(A2)) is in the range of 1.25-2.5, preferably 1.5-2.25, most preferably 1.75-2.0.

This leads to the advantage of improved mechanical properties and chemical resistance. It also improves weathering resistance and decreases air entrapment.

Preferably, the total amount of the sum of the polyol (A1) and the polyol (A2) ((A1)+(A2)) is 30 to 75%, preferably 35 to 60%, more preferably 40 to 50% by weight, based on the total weight of component (A).

This leads to the advantage of improved cooling properties in combination with improved mechanical properties and chemical resistance.

Apart from the above-mentioned polyols, the polyol component (A) may contain further additives. Such additives are commonly used, if desired, and typically known to the persons skilled in the art of polyurethanes. Examples of optional additives are plasticizers, pigments, adhesion promoters, such as silanes, e.g. epoxysilanes, (meth)acrylatosilanes and alkylsilanes, stabilizers against heat, light, and UV radiation, thixotropic agents, flow improving additives, flame retardants, surface active agents such as defoamers, wetting agents, flow control agents, deaerating agents, biocides and emulsifiers.

Preferably, the polyol component (A) comprises one or more additives selected from the group consisting of plasticizers, pigments, adhesion promoters, stabilizers against heat, light, and UV radiation, thixotropic agents, flow improving additives, flame retardants, surface active agents, defoamers, wetting agents, flow control agents, de-aerating agents, biocides and emulsifiers.

Further used optional additives for component (A) are one or more plasticizers, such as benzoates (benzoate esters), benzyl phthalates, e.g. Santicizer® 160 (benzylbutyl phthalate), citric acid esters, e.g. Citrofol®B II (acetyltributyl citrate), ethoxylated castor oil, stearates (preferably ethylene oxide modified), propyleneglycol laurates, and diisopropylbenzene, e.g. Benzoflex® 9-88.

In a preferred embodiment, component (A) comprises 0 to 10%, preferably 0 to 5% by weight, 0 to 1% by weight of a plasticizer, 0% by weight, based on the total weight of component (A).

Preferred suitable additives may include pigments, such as inorganic and organic pigments, e.g. Bayferrox® and Heucosin®, defoamers, such as solvent silicon free and polyorganosiloxane, e.g. Tego®Airex and Efka®, and emulsifiers such as calcium hydroxide and calcium oxide.

Preferably, the polyol component (A) further comprises inorganic and organic fillers, preferably selected from the list consisting of ground or precipitated calcium carbonates which are optionally coated with fatty acids in particular stearates, barite (heavy spar), talc, quartz powders, quartz sand, dolomites, wollastonites, kaolins, calcinated kaolins, molecular sieves and silicic acids including highly-dispersed silicic acids from pyrolysis processes.

Preferably, the particle size of the inorganic and organic fillers is 0.1-50 µm, more preferably 1-30 µm.

Preferably, the amount of the inorganic and organic fillers is between 25-55 wt-%, preferably between 30-50 wt-%, more preferably between 30-40 wt-%, based on the total weight of the polyol component (A).

Preferably, the polyol component (A) is essentially free of water. Preferably the amount of water is less than 0.5 wt-%, preferably less than 0.1 wt-%, more preferably less than 0.05 wt-%, based on the total weight of the polyol component (A).

Hardener Component (B)

The hardener component (B) comprises one or more polyisocyanates. Hardener component (B) is preferably a liquid component. The hardener component (B) may be viscous but is generally pourable.

Preferably, the hardener component (B) comprises an aliphatic polyisocyanate B1.

This has the technical advantage of improved UV stability, especially reduced discoloration.

The term "aliphatic isocyanate" refers to an isocyanate whose isocyanate groups are bonded directly to an aliphatic carbon atom. Accordingly, such isocyanate groups are referred to as "aliphatic isocyanate groups".

Preferably, the hardener component (B) comprises an aliphatic polyisocyanate B1, in particular selected from the list consisting of monomeric di- or triisocyanates, oligomers, polymers and derivatives of monomeric di- or triisocyanates.

Preferred aliphatic monomeric polyisocyanates B1 are aliphatic or cycloaliphatic diisocyanates, in particular HDI, TMDI, cyclohexane-1,3- or -1,4-diisocyanate, IPDI, H12MDI, 1,3- or 1,4-bis (isocyanatomethyl) cyclohexane and XDI.

A particularly preferred monomeric polyisocyanate B1 is HDI, IPDI or H12MDI. Most preferred is HDI or IPDI, especially HDI.

Suitable oligomers, polymers and derivatives of the stated mono- and diisocyanates are in particular derived from HDI or IPDI, in particular HDI. Of these, particularly suitable are commercially available types, for example Desmodur® N 75, Desmodur® N 3600 and Desmodur® N 3900 (all from Bayer). Preferably, they have an NCO content of 16 to 20% by weight, preferably 16 to 18% by weight.

Especially preferred as aliphatic polyisocyanates B1 are oligomers, polymers and derivatives derived from HDI or IPDI, in particular HDI. Preferably, they have an NCO content of 16 to 20% by weight, preferably 16 to 18% by weight.

It is also advantageous if the sum of the NCO groups which do not originate from B1 is preferably ≤20%, in particular ≤10%, particularly preferably ≤5%, most preferably ≤1%, based on the sum of all NCO-groups of two-component polyurethane composition.

Preferably, the proportion of the aliphatic polyisocyanate B1≥90 wt.-%, in particular ≥95 wt.-%, particularly preferably ≥99 wt.-%, based on the total weight of the hardener component (B).

Glass Microspheres

The polyurethane composition further comprises 0.5-8 wt % of hollow glass microspheres, based on total weight of the polyurethane composition.

The glass microsphere, as used in the context of the present invention, need not be perfectly spherical glass microsphere, it may be of other shapes resembling spheres for example, pits or ellipsoid. The spherical shape of glass microspheres provides a variety of inherent advantages over irregularly-shaped mineral fillers or glass fiber.

The glass microspheres used for the present invention are hollow glass microspheres. Hollow glass microspheres, are added to create a barrier effect of heat flowing from the outside of the coating film produced from the polyurethane composition, thereby reducing heat inflow.

The hollow glass microspheres have a core and shell construction, where the core is hollow, and is filled with a gas either at atmospheric pressure or at reduced pressure. The shell is primarily made of glass containing silicon dioxide ($SiO_2$) as a main component, with sodium oxide (NaO2), magnesium oxide (MgO), calcium oxide (CaO), boron oxide (B2O5), phosphorus oxide (P2O5), and the like as accessory components. The hollow glass spheres suppress the conduction of heat due to a hollow inside.

The glass microspheres or spheres, sometimes called hollow glass bubbles, or glass balloons, may be made in a variety of sizes and densities. The outer diameter of the bubble, and the thickness of the glass bubble wall, determines the volume of air (or vacuum) inside the bubble, and therefore its density. The air (or vacuum) inside the hollow glass bubble also reduces the thermal conductivity of the glass.

Typically, the hollow glass microspheres having an average diameter of less than about 500 micrometers, are commonly known as "glass microbubbles", "glass bubbles", "hollow glass beads", or "glass balloons".

The hollow glass microspheres preferably have an aspect ratio within a range of 0.85≤(short axis/long axis), more preferably 0.90≤(short axis/long axis), and most preferably 0.95≤(short axis/long axis). If the aspect ratio of the hollow glass microspheres is low, there will be a tendency for high shear force to act during molten plastic compounding which result in increase in stress concentration. In the presence of the increased stress conditions the hollow condition will not be possible to maintain, and the hollow glass microspheres may get crushed.

Furthermore, with regards to a size of the hollow glass microspheres, a median diameter (volumetric % diameter) is preferably from 10 μm to 70 μm, more preferably from 10 μm to 35 μm. Furthermore, a 90 volume % diameter is preferably controlled within a range of 30 μm to 200 μm, more preferably 30 μm to 70 μm. The size of the hollow glass microspheres can be measured using a commercial laser diffraction particle size analyzer (wet type, recirculating).

Suitable examples of the hollow glass microspheres that can be used for the polyurethane composition of the present invention is 3M (trademark) Glass Bubbles. Glass Bubbles are engineered hollow glass microspheres that are alternatives to conventional fillers and additives such as silicas, calcium carbonate, talc, clay, etc., for many demanding applications. Grades of product that can be used for the present invention include S60HS (true density 0.6 g/cm3, 10 volume % isostatic crush strength 18,000 PSI or higher (124 MPa or higher)), iM30K(true density 0.6 g/cm3, 10 volume % isostatic crush strength 27,000 PSI or higher (186 MPa or higher)), S60 (true density 0.6 g/cm3, 10 volume % isostatic crush strength 10,000 PSI or higher (69 MPa)), K42HS (true density 0.42 g/cm3, 10 volume % isostatic crush strength 8000 PSI or higher (55 MPa or higher)), K1 (true density 0.125 g/cm3, isostatic crush strengths of 250 psi with a minimum of 80% survival), S28HS (true density 0.28 g/cm3, isostatic crush strengths of 3,000 psi with a minimum of 90% survival) or the like.

Preferably, the hollow glass microspheres used for the polyurethane composition of the invention is S28HS. The glass microspheres S28HS are high-strength additives for polymers made from a water-resistant and chemically stable soda-lime borosilicate glass and has a white or gray color, has a density of 028 g/cc, crush strength of 3,000 psi with 90% survival psi, softening temperature about 600° C.

An amount of hollow glass microspheres in the polyurethane resin composition is preferably 50 volume % or less, with regards to the polyurethane resin composition.

Preferably, the fraction of the hollow glass microspheres being preferably from 1-7 wt.-%, 1.5-6.5 wt.-%, 2-6 wt.-%, 2.5-5.5 wt.-%, 3-5 wt.-%, most preferably 4-5 wt.-%, based on total weight of the polyurethane composition.

Preferably, the hollow glass microspheres are added to the polyol component (A) of the polyurethane composition.

Preferably, the hollow glass microspheres have an isostatic crush resistance from 200-50000 psi, preferably 250-18000 psi, more preferably 2500-3500 psi, preferably as determined by ASTM D1213.

Preferably, the outer diameter of the hollow glass microspheres being preferably from 1-350 microns, 15-120 microns, 20-100 microns, more preferably 25-50 microns.

Preferably, the hollow glass microspheres are composed of sodium borosilicate glass and preferably having an isostatic crush resistance of at least 2.06×107 Pa (3000 psi) as determined by ASTM D1213.

The addition of hollow glass microspheres (or glass bubbles) to a resin system can decrease thermal conductivity, depending on the grade and amount of microspheres used. The selection of appropriate hollow glass microspheres (or glass bubbles) and its dosage plays crucial role in achieving the desired property or usage.

For instance, in case of the present invention, an amount of less than 0.5 wt.-% leads to an insufficient improvement of the tactile comfort of the heated composition and an amount of more than 8 wt.-% leads to insufficient applicability. When the glass microspheres are less than 0.5% by weight, the barrier effect is insignificant, and when the glass microspheres are more than 8% by weight, the volume concentration increases and the coating film is difficult to apply and may also get easily broken. Additionally, the coating film adhesiveness also falls.

Suitable Proportions for the Composition

Preferably, the ratio by weight of polyol component (A) to hardener component (B) is 5:1 to 2:1, more preferably 4:1 to 3:1.

Preferably the molar ratio between free NCO-groups and NCO-reactive groups, preferably OH-groups, in the composition of the invention before mixing is between 0.8-1.2, preferably 0.9-1.1.

The application temperature is e.g. from about 8 to 40° C., preferably from about 10 to 30° C.

The cured composition is preferably obtained by curing the composition at a curing temperature from 5° C. to 35° C., preferably from 10° C. to 30° C., and at a relative humidity from 20% to 80%.

Application Method

A further aspect of the present invention therefore relates to a method for applying a mixed polyurethane composition as described in detail above, preferably as a flooring material, wherein the method comprises the steps of:
a) providing a space where the polyurethane composition is applied;
b) mixing components (A) and (B) of the polyurethane composition to obtain a mixed polyurethane composition;
c) applying the mixed polyurethane composition on a desired location and in a desired shape within the space provided;
d) allowing the applied mixed polyurethane composition to cure.

For use, the polyol component (A) and the hardener component (B) are mixed with each other to prepare the mixed polyurethane composition. Thereafter, the mixed polyurethane composition is applied on a desired location and in a desired shape to create a flooring surface, especially ship decks.

The space provided to apply the mixed polyurethane composition of the invention can be made of any convenient material selected from the group consisting of concrete, glass, gypsum board, metal, plastic, rubber, wood, and combinations thereof. Preferably, the space provided to apply the mixed polyurethane composition of the invention is made up from metal.

Preferably, the thickness of the cured polyurethane composition in step d) is 5-15 mm, more preferably 5-10 mm. This is especially preferred if the creation of ship decks is intended.

In an embodiment, the method for applying a mixed polyurethane composition, preferably further comprises a step (e) of mechanically treating a surface of the cured polyurethane composition of step (d), preferably by grinding the surface of the cured polyurethane composition to remove a thickness of the cured polyurethane composition from the surface, preferably 5-50%, more preferably 10-20% of the thickness of the cured polyurethane composition.

Particularly, this method is used to create floors and/or ship decks, especially ship decks.

The polyurethane composition of the invention is preferably used as a flooring material. More preferably, as flooring material for ship decks.

Sanding/Grinding

In an embodiment of the invention, sanding is performed on the surface of the cured applied/casted mixed polyurethane composition.

Preferably, sanding is performed by using a sand paper like material, or more preferably a sand paper with a grit size according to ISO 6344 of 12-40, preferably 16-40, more preferably 16-24, most preferably 16.

A skilled artisan will know that any other suitable means available in the art can also be used to perform sanding. For e.g. sanding machine Preferably, sanding is performed to create an even surface and appealing appearance of the surface.

Preferably, sanding is performed in creating ship decks.

EXAMPLES

Composition

The composition is a two-component polyurethane flooring composition. The composition of component (A) and component (B) are shown below in Table 1-3. The ingredients indicated below were mixed to form component (A) and component (B):

TABLE 1

| component (A) | |
| --- | --- |
| Ingredient | Weight % based on weight of component (A) |
| Reaction product of castor oil with ketone resin, OH number of 155 mg KOH/g, OH equivalent weight of about 360 g/eq, Setathane D 1150 (Nuplex Resins GmbH, Germany) | 30 |
| Trifunctional polypropylene polyether polyol, OH-number 370-400 mg KOH/g | 16 |
| Plasticizer | 5 |
| Talc (filler) | 5 |
| Micronized dolomite (filler) | 29.7 |
| Baryte (filler) | 9 |
| Molecular sieve | 5 |
| Defoamer | 0.2 |
| Tin catalyst | 0.1 |

TABLE 2 component (B)

| Ingredient | Weight % based on weight of component (B) |
| --- | --- |
| HDI trimer containing 70% trimer and smaller amounts of higher oligomers, overall NCO functionality = 3.1, Desmodur N 3600 (Covestro) | 100 |
| Mix ratio A:B | 15:5 |

TABLE 3

| Ingredient | |
| --- | --- |
| Glass bead 1 | Glass bubbles S28HS, Average diameter 30 μm, 3M company |
| Glass bead 2 | Glass bubbles K1, Average diameter 65 μm, 3M company |
| Fly ash | Fillite, Omya |

For the compositions shown in table 4, the amount of glass bead 1, glass bead 2, and fly ash indicated in table 4 was added to component (A) by replacing micronized dolomite with the added amount. The amounts for glass bead 1, glass bead 2, and fly ash shown in table 4 refer to the wt-%, based on the total composition (sum of (A) and (B) component).

A total of 1 kg of total material (sum of (A) and (B) component) was mixed for 3 min at 300 rpm and further tested below.

Test methods used for the testing of respective properties of the samples obtained from exemplified and comparative reference compositions are described in the Table 4:

TABLE 4

Tensile strength (DIN 53504)
Tear strength (ISO 34-1)
Elongation at Break (DIN 53504)
Short A hardness (DIN 53505)
Surface appeal
Tests were conducted to study the effect of adding glass bead, respectively fly ash, on the surface appeal after cure. The mixed polyurethane composition was applied on a surface and cured. The appeal of the cured surface was assessed by eye before and after sanding with a sand paper with a grit size according to ISO 6344 of 24.
+ = appealing pinhole free surface, nice wood-look effect
+/− = surfaces defect like pinholes
− = fly ash aggregates/accumulates on surface or lot of pinholes
Touch test
The samples had the following size 300 mm × 210 m × 6 mm. They were placed into an oven with a temperature of 80° C. and stayed there for at least 240 min. Then the samples were taken out and immediately touched with the bare hand in order to assess the discomfort upon touching the sample:

TABLE 4-continued

−− = high discomfort-too hot to touch
− = medium discomfort-just able to keep you hand on it, but with discomfort feeling
+/− = discomfort-Hot, able to keep you hand on it
+ = no discomfort-warm to touch
++ = comfortable to touch
Lamp test
Sample films of A4 size (6 mm thickness) of the compositions Ex. 1, Ex. 2 and Ref.1 (all colored with brown pigments to obtain brown color) completely covering a separate steel plate were placed under an IR lamp (simulating a steel deck of a ship). Below the steel an insulating layer was placed. To set the intensity of the IR radiation the distance of lamp was set as such that the lamp heated up the surface of a black colored film consisting of the same material as Ref.1 to 85° C. (reference). The temperature of the sample plate surface was monitored by laser measurements, after the reference reached a temperature of 85° C. the temperature of the surfaces of the films of Ex. 1, Ex. 2 and Ref.1 ("Surface temperature film") as well their steel plates ("Surface temperature steel plate") was measured by laser measurements. Further, the surface of the three films were assessed immediately after the measuring the temperature by touching ("touch") and rated according the rating of the "touch test" described above.
Workability
Tests were conducted to study the effect on the workability of the addition of the components of table 3 to the mixed polyurethane composition. The mixed polyurethane composition is poured on a surface. Tested was the ease for a person skilled in the art of applying and distributing the material in order to obtain an even and smooth, levelled and pinhole free surface.
++ = very easy to apply/distribute-strong self-levelling
+ = easy to apply/distribute self-levelling
+/− = needs effort to apply/distribute, but self-smoothing
− = difficult to apply/distribute, Spike rolling needed
−− = not able to make a smooth and levelled surface
Abrasion
Taber abrasion, CS 17 ( 1000 × 1000 ), weight loss in mg
UV resistance
By QUV-UVA, QUV-UVB, Qsun

*all test (except workability) performed after curing test samples 1 week at room temperature and for 2 weeks at 50° C.

TABLE 5

| | Test Results | | | | | |
| --- | --- | --- | --- | --- | --- | --- |
| | Ref. 1 | Ex. 1 | Ex. 2 | Ex. 3 | Ref. 2 | Ref. 3 |
| Fly ash | 0 | | | | | 12 wt.-% |
| Glass bead 1 $_{on\ A+B}$ | 0 | 3 wt.-% | 4.5 wt.-% | 9 wt.-% | 11.5 wt.-% | |
| Surface appeal | + | + | + | +/− | − | − |
| Touch test | −− | +/− | + | ++ | ++ | ± |
| Lamp Test | | | | | | |
| Surface temperature film | ±70° C. | ±70° C. | ±70° C. | n.d. | n.d. | n.d. |
| Touch | − | ± | ± | | | |

TABLE 5-continued

Test Results

|  | Ref. 1 | Ex. 1 | Ex. 2 | Ex. 3 | Ref. 2 | Ref. 3 |
| --- | --- | --- | --- | --- | --- | --- |
| Surface temperature steel plate | 80° C. | 77° C. | 74° C. |  |  |  |
| Workability | ++ | + | + | − | −− | n.d. |
| Taber CS17 1000/1000 | 22 | n.d. | 11 | n.d. | n.d. | n.d. |
| Taber H22 1000/1000 | 127 | n.d. | 142 | n.d. | n.d. | n.d. |
| UV resistance | + | + | ++ | n.d. | n.d. | n.d. |
| Tensile strength | 8 Mpa | 8 Mpa | 10-11 MPa | n.d. | n.d. | n.d. |
| Tear strength | 18 N/mm | 22 N/mm | 35- 36 N/mm | n.d. | n.d. | n.d. |
| Elongation at break | 66% | 55% | 59% | n.d. | n.d. | n.d. |
| Shore A | 84 | 84 | 91 | n.d. | n.d. | n.d. | n.d. = not determined

The test results showcased in Table 5 depicts the surprising effects of the polyurethane coating composition according to the invention.

The reference formulation Ref-1, which does not contain the hollow glass microsphere perform extremely poor in the touch test for heat discomfort (or tactile performance). On the other hand, the Example 1-3 which contains 3-9 wt % of glass beads perform well in the touch test.

It has been observed that on increasing the wt % of the glass beads in the exemplified compositions, the tactile performance may increase but the surface appeal diminishes significantly. This can be well evident by comparing the test results of Ex. 2, Ex. 3 and reference example Ref. 2.

It has been surprisingly found that the addition of hollow glass microspheres (or glass beads) to polyurethane based floors significantly reduces the discomfort to the skin due to IR radiation if compared to standard resin solutions. Further, the thermal conductivity of the panels was reduced. Panels submitted to high temperature or intensive IR radiation show a significant reduction of heat discomfort to the skin if compared to standard polyurethane compositions.

The reduction reached a peak at the addition of more than 4.5 wt.-% glass beads, based on the total amount of the polyurethane composition. Further, addition of glass beads decreases the workability of the compositions. It has been observed that the compositions were difficult to apply using 9 wt.-% and were not usable any more at 11.5 wt.-% glass beads.

A comparative study between the exemplified formulations of the invention and the reference example 3 showcase the effect using fly ash instead of hollow glass microspheres. The test results of reference example show poor performance, especially with regards to the surface appeal. Which could be ascribed to the fact that the fly ash used did not mix well with the composition and typically end on the surface of the cured composition.

Results revealed that the addition of hollow glass microspheres (or glass beads), into polyurethane compositions can significantly improve the heat shielding performance along with the other desirable properties such as Shore A, UV resistance, tensile strength, tear strength and abrasion.

As shown by the tests carried out on both inventive and comparative compositions, the polyurethane coating composition of the invention can withstand exposure to relatively harsh environment maintaining robust long-term physical performance.

It has been showcased experimentally that the polyurethane coating composition according to the invention makes it possible to fully achieve the set aim and objects. Thus, the polyurethane coating composition according to the present invention may advantageously be used for floor coating compositions used in marine industry.

The invention claimed is:

1. A method for applying a polyurethane composition, as a flooring material,
   wherein the polyurethane composition comprises:
   A) a polyol component (A) comprising at least one polyol; and
   B) a hardener component (B) comprising at least one polyisocyanate,
   wherein the polyurethane composition further comprises 0.5-8 wt. % of hollow glass microspheres, based on a total weight of the polyurethane composition,
   wherein the method comprises:
   a) providing a space where the polyurethane composition is to be applied;
   b) mixing components (A) and (B) of the polyurethane composition to obtain a mixed polyurethane composition;
   c) applying the mixed polyurethane composition on a desired location and in a desired shape within the space provided;
   d) allowing the applied mixed polyurethane composition to cure; and
   e) mechanically treating a surface of the cured polyurethane composition, by grinding the surface of the cured polyurethane composition to remove a thickness of the cured polyurethane composition from the surface, 5-50%, of the thickness of the cured polyurethane composition.

2. The method according to claim 1, wherein the polyol component (A) comprises:
   at least one polyol (A1) having an average molecular weight of 250 to 30,000 g/mol and an average OH functionality in the range from 1.6 to 3; and
   at least one polyol (A2) having an average molecular weight of 360 to 4000 g/mol.

3. The method according to claim 2, wherein the polyol (A1) is selected from polyhydroxy-functional natural fats and polyhydroxy-functional natural oils or a polyol obtained by chemical modification of a natural fat or natural oil, wherein the polyol (A1) is castor oil or a chemical modification thereof and the polyol (A2) is a di- or triol.

4. The method according to claim 2, wherein the weight ratio of the polyol (A1) to the polyol (A2) ((A1)/(A2)) is in the range of 1.25-2.5.

5. The method according to claim 1, wherein the polyol component (A) further comprises inorganic and organic fillers, selected from the group consisting of ground or precipitated calcium carbonates which are optionally coated with fatty acids, barite, talc, quartz powders, quartz sand, dolomites, wollastonites, kaolins, calcinated kaolins, molecular sieves and silicic acids including highly-dispersed silicic acids from pyrolysis processes.

6. The method according to claim 1, wherein the hardener component (B) comprises an aliphatic polyisocyanate B1, selected from the group consisting of monomeric di-or triisocyanates, oligomers, polymers and derivatives of monomeric di-or triisocyanates.

7. The method according to claim 1, wherein a ratio by weight of the polyol component (A) to the hardener component (B) is from 5:1 to 2:1.

8. The method according to claim 1, wherein the fraction of the hollow glass microspheres is from 1 to 7 wt. %, based on total weight of the polyurethane composition.

9. The method according to claim 1, wherein an outer diameter of the hollow glass microspheres is from 1 to 350 microns.

10. The method according to claim 1, wherein the hollow glass microspheres have an isostatic crush resistance of from 200 to 50000 psi, as determined by ASTM D1213.

11. The method according to claim 1, wherein the hollow glass microspheres are composed of sodium borosilicate glass and have an isostatic crush resistance of at least $2.06 \times 10^7$ Pa (3000 psi) as determined by ASTM D1213.

12. The method according to claim 1 to create floors and/or ship decks.

* * * * *